J. GARRARD.
Harvester-Rake.
No. 219,932. Patented Sept. 23, 1879.
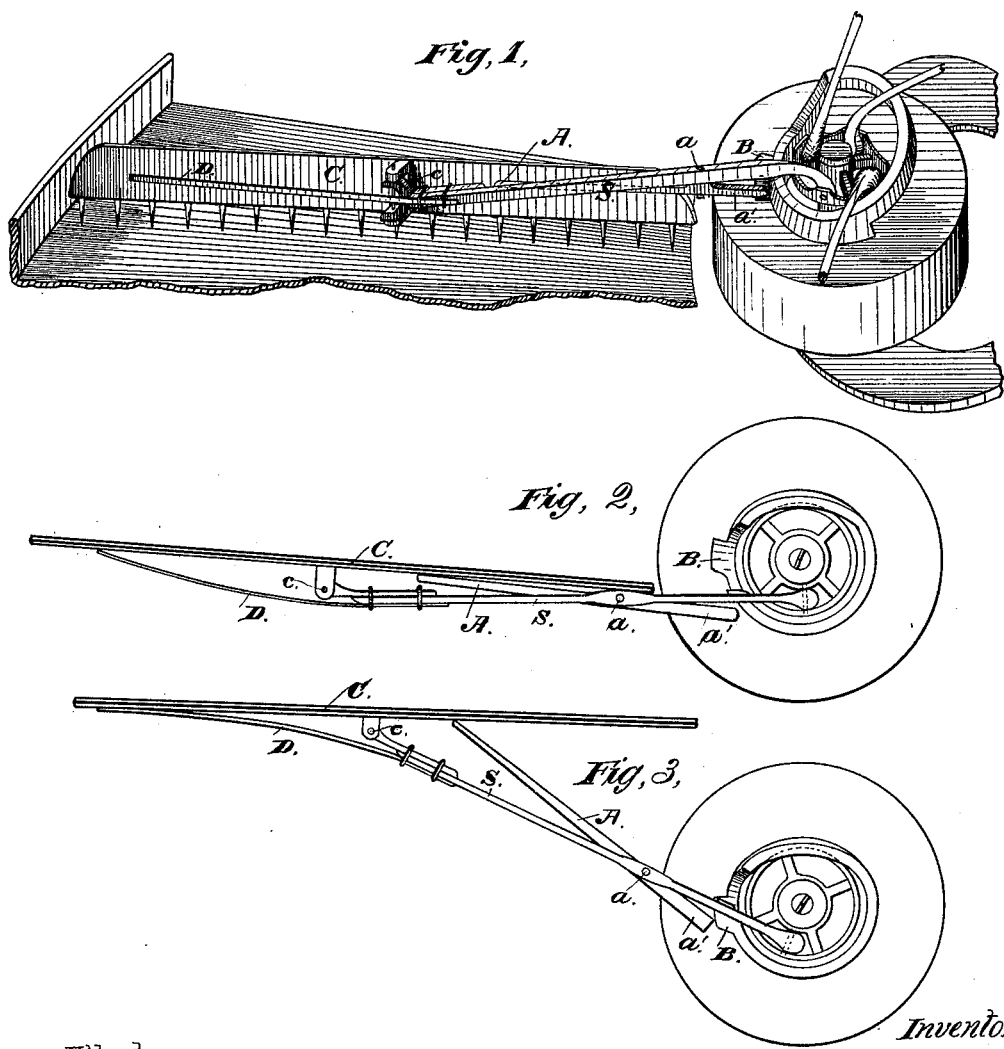
Attest:
Geo. T. Smallwood Jr.
Walter Allen
Inventor:
Jeptha Garrard
By Knight Bros atty

UNITED STATES PATENT OFFICE.

JEPTHA GARRARD, OF CINCINNATI, OHIO, ASSIGNOR TO ANNA K. GARRARD, OF SAME PLACE.

IMPROVEMENT IN HARVESTER-RAKES.

Specification forming part of Letters Patent No. 219,932, dated September 23, 1879; application filed June 20, 1879.

*To all whom it may concern:*

Be it known that I, JEPTHA GARRARD, of Cincinnati, in the county of Hamilton, State of Ohio, have invented a certain new and useful Improvement in Raking Attachments for Reapers, of which the following is a specification.

My present invention relates to improvements in harvesting machinery; and consists of a novel attachment and movement of the rake of a reel-rake which delivers the cut grain off of the grain-platform.

In the ordinary delivery by a sweep-rake the grain lying on the grain-platform toward the outer end of the rake is moved more rapidly than that moved by the inner end of the rake, since the outer end of a radius moves over more space in a given time than the part nearer the center.

The object of this invention is to cause an acceleration in the speed of the motion of the inner end of the rake, in order that the grain moved by this end may have imparted to it at the time of delivery from the grain-platform a movement more rapid than it would otherwise have, and also in order that the thrust of the inner end of rake may be more extended and may be continued longer in a given travel of the rake-head than it otherwise would be.

In delivery onto a supplemental platform the ordinary sweep-rake would fail to make a good delivery of the inner grain, failing to throw the butts far enough or with sufficient momentum to go fairly onto the supplemental platform.

The present invention obviates this difficulty.

In order that my invention may be fully understood, I will proceed to describe it with reference to the accompanying drawings, in which—

Figure 1 is a perspective view of my improved raking attachment. Fig. 2 is a plan of the same. Fig. 3 is a plan thereof, showing the heel of the rake advanced.

A represents a lever fulcrumed at $a$ to the stale or arm S of the rake C, which latter is hinged at $c$ to the extremity of its stale S.

B represents a lug or projection on the stationary-cam frame to arrest the heel $a'$ of the lever A at the proper period of the rotation of the rake, so as to throw the outer end of the said lever A forward, the effect being to throw the heel of the rake forward at increased speed by reason of the pressure of the end of the lever A against the back of the rake between its fulcrum $c$ and its heel or inner end.

D represents a spring attached to the stale S, and bearing against the back of the rake C near its outer end, so as to restore it to its normal position as soon as the lever A is released from the lug B by the rotary movement of the rake.

The operation is as follows: The rake operates as an ordinary sweep-rake, carrying the cut grain back on the grain-platform until the straw has reached a point where it is deemed advisable to increase the speed of the movement of the inner straw. At this point of time the lever A strikes the lug B on the rake-cam frame and its outer end is forced forward, the lever turning on its pivot. This lever rests on the surface of the inner end of the hinged rake C, and in its forward movement carries or pushes the inner end of the rake also forward, imparting the desired gain of motion to the straw. The lug holds the lever as long as may be desired, and then, the lever being disengaged by the continuous motion of the rake-head and the stale of the hinged rake, whose motion has not been disturbed, the spring D forces the rake back to its first and ordinary position.

Having thus described my invention, the following is what I claim as new and desire to secure by Letters Patent:

The combination of a hinged rake, rake-stale, moving lever, spring, and a lug on the rake-cam frame, substantially as set forth.

JEPTHA GARRARD.

Witnesses:
L. H. GARRARD,
FRANK RICH.